(12) United States Patent
Hwang

(10) Patent No.: US 9,621,373 B2
(45) Date of Patent: *Apr. 11, 2017

(54) PROXY ADDRESS RESOLUTION PROTOCOL ON A CONTROLLER DEVICE

(71) Applicant: Cisco Technology, Inc., San Jose, CA (US)

(72) Inventor: Tae Hwang, Laurel, MD (US)

(73) Assignee: Cisco Technology, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 14/936,789

(22) Filed: Nov. 10, 2015

(65) Prior Publication Data

US 2016/0065385 A1    Mar. 3, 2016

Related U.S. Application Data

(63) Continuation of application No. 14/056,072, filed on Oct. 17, 2013, now Pat. No. 9,264,362.

(51) Int. Cl.

| | | |
|---|---|---|
| H04L 12/28 | (2006.01) | |
| H04L 12/46 | (2006.01) | |
| H04L 12/801 | (2013.01) | |
| H04L 12/931 | (2013.01) | |
| H04L 12/24 | (2006.01) | |
| H04L 29/12 | (2006.01) | |
| G06F 9/455 | (2006.01) | |
| H04L 12/741 | (2013.01) | |
| H04L 12/751 | (2013.01) | |

(52) U.S. Cl.
CPC ...... *H04L 12/4633* (2013.01); *G06F 9/45558* (2013.01); *H04L 12/4641* (2013.01); *H04L 41/0813* (2013.01); *H04L 45/745* (2013.01); *H04L 47/12* (2013.01); *H04L 49/70* (2013.01); *H04L 61/103* (2013.01); *G06F 2009/45595* (2013.01); *H04L 45/02* (2013.01)

(58) Field of Classification Search
CPC ..... H04L 47/12; H04L 49/70; H04L 12/4633; H04L 45/745; H04L 12/4641; H04L 61/103
USPC ......................................................... 370/331
See application file for complete search history.

(56) References Cited

U.S. PATENT DOCUMENTS

| | | | | |
|---|---|---|---|---|
| 6,751,221 | B1 * | 6/2004 | Saito | ............... H04L 12/2803 370/392 |
| 2006/0294211 | A1 * | 12/2006 | Amato | ............... H04L 69/40 709/220 |
| 2007/0201469 | A1 | 8/2007 | Iyer et al. | |
| 2010/0257263 | A1 * | 10/2010 | Casado | ............... H04L 49/00 709/223 |
| 2012/0033665 | A1 * | 2/2012 | Jacob Da Silva | .... H04L 45/245 370/389 |

(Continued)

*Primary Examiner* — Sai-Ming Chan
(74) *Attorney, Agent, or Firm* — Edell, Shapiro & Finnan, LLC

(57) ABSTRACT

Techniques are presented herein for reducing network congestion in data center environments. A virtual switch, hosted by a server device in the network, registers with a controller device to enable the virtual switch to exchange address information with the controller device. The virtual switch generates mapping information comprising Media Access Control addresses of one or more virtual machines that are in communication with the virtual switch. The mapping information is sent to the controller device.

20 Claims, 15 Drawing Sheets

(56) References Cited

U.S. PATENT DOCUMENTS

| | | |
|---|---|---|
| 2012/0079478 A1 | 3/2012 | Galles et al. |
| 2012/0291028 A1* | 11/2012 | Kidambi ............... H04L 49/602 |
| | | 718/1 |
| 2013/0108263 A1 | 5/2013 | Srinivas et al. |
| 2014/0280841 A1 | 9/2014 | Kamble et al. |
| 2015/0109923 A1 | 4/2015 | Hwang |

* cited by examiner

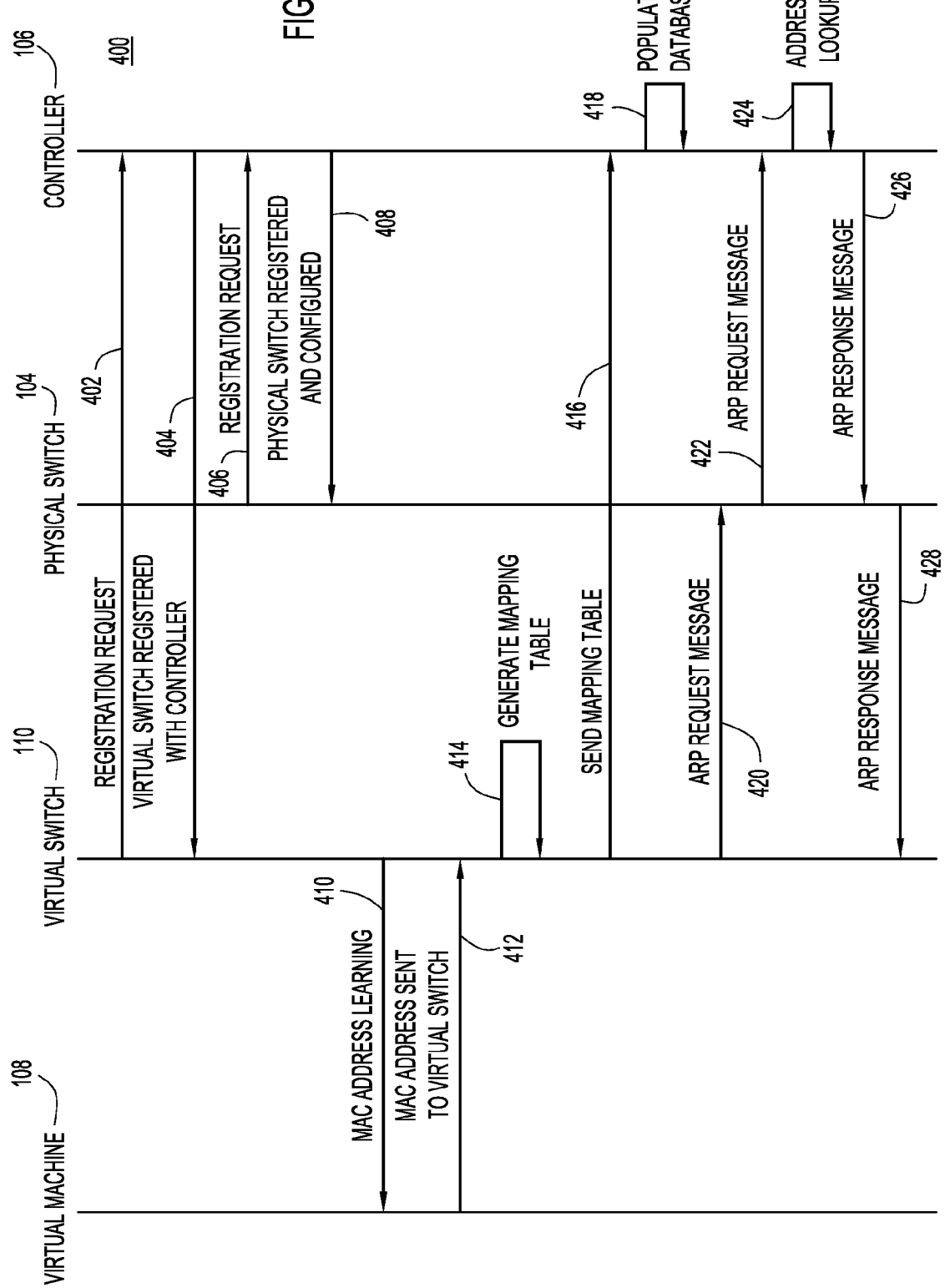

PROXY ADDRESS RESOLUTION PROTOCOL ON A CONTROLLER DEVICE

CROSS-REFERENCE TO RELATED APPLICATIONS

This application is a continuation application of U.S. patent application Ser. No. 14/056,072 entitled "Proxy Address Resolution Protocol on a Controller Device," filed Oct. 17, 2013, the content of which is hereby incorporated by reference herein.

TECHNICAL FIELD

The present disclosure relates to reducing network congestion in large data center environments.

BACKGROUND

In network environments, physical servers ("servers") may be located in a rack unit that houses a plurality of servers. The rack unit has a top of rack (ToR) switch that is configured to manage communications between the servers and other network elements within the rack unit. The servers may be configured to host one or more virtual machines that may be arranged in one or more virtual networks. Furthermore, the servers may be configured to host one or more virtual switches that are configured to manage communications to and from the virtual machines.

Large network or data center environments may comprise multiple rack units, each of which has a ToR switch, a plurality of servers, and a plurality of virtual machines and virtual switches hosted by the servers. In such topologies, a central controller device may be present to manage or direct communications between rack units. The central controller device, thus, may be in communication with the ToR switches in each rack unit to manage communications to and from the rack units in the data center environment.

BRIEF DESCRIPTION OF THE DRAWINGS

FIG. 4 shows an example ladder diagram depicting messages that are exchanged between a virtual machine, virtual switch, ToR switch and controller device.

DESCRIPTION OF EXAMPLE EMBODIMENTS

Overview

Techniques are presented herein for reducing network congestion in data center environments. In one embodiment, a controller device in a network receives a registration request from a physical switch device and from a virtual switch that is hosted by a server device in the network. The controller device registers the physical switch device such that the controller device is able to send configuration messages to the physical switch device. The controller device also registers the virtual switch such that the controller device is able to receive mapping information from the virtual switch. The controller device receives from the virtual switch the mapping information comprising Media Access Control address information of one or more virtual machines that are in communication with the virtual switch. The mapping information is stored in a database maintained by the controller device.

In another embodiment, the physical switch device in the network sends a registration message to the controller device to enable an exchange of an address request messages between the physical switch device and the controller device. The physical switch device receives from the controller device a configuration message that comprises instructions for the switch device to send to the controller device any address request messages received by the switch device.

Furthermore, in another embodiment, the virtual switch, hosted by a server device in the network, registers with the controller device to enable the virtual switch to exchange address information with the controller device. The virtual switch generates mapping information comprising Media Access Control addresses of one or more virtual machines that are in communication with the virtual switch. The mapping information is sent to the controller device.

Example Embodiments

Figure 1:
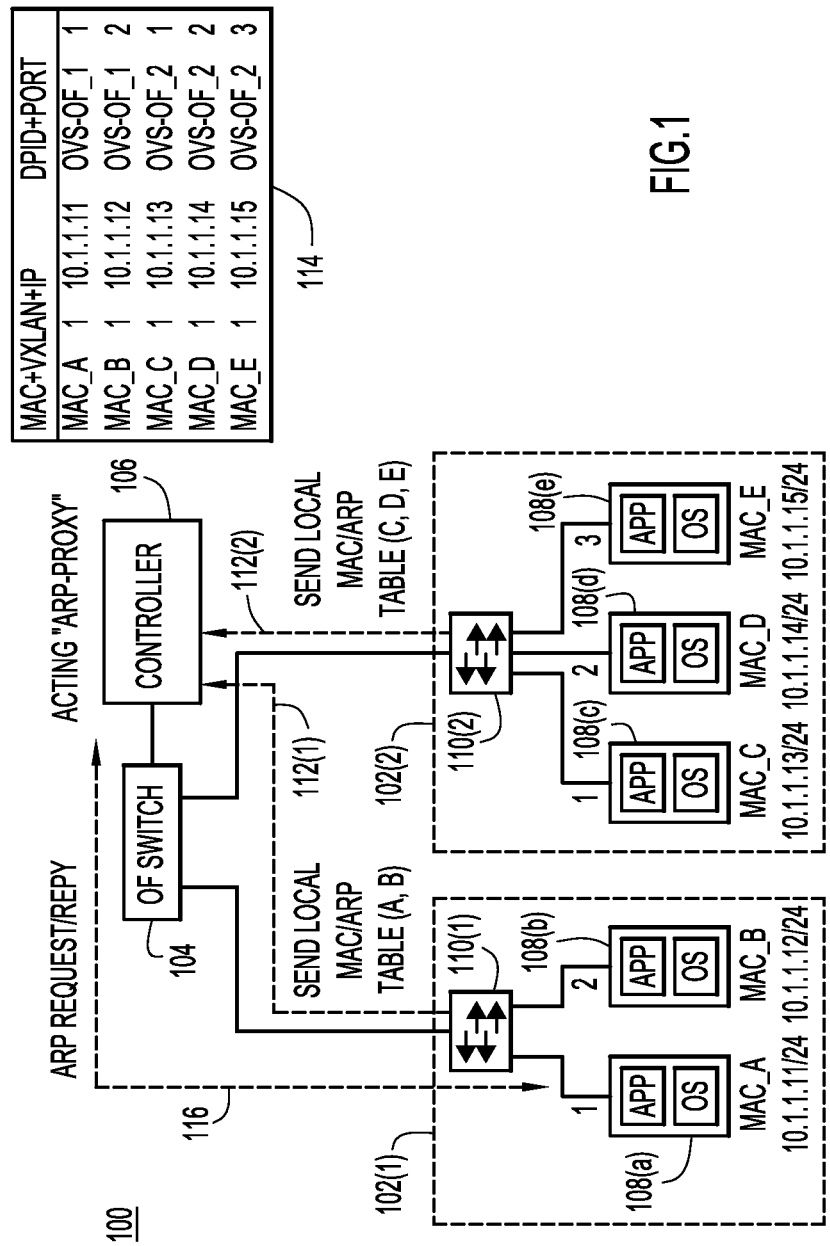
FIG. 1 shows an example network topology that includes a plurality of virtual switches that are configured to register with a controller device and to send to the controller device address information of virtual machines.

The techniques described hereinafter involve reducing network congestion in data center environments and optimizing address information distribution among network devices. Referring first to FIG. 1, an example network/topology 100 is shown. The network/topology 100 is referred to hereinafter as a "network," "network environment," "data center" or "data center environment." The network 100 has a plurality of network devices. In particular, in FIG. 1, the network 100 includes a plurality of physical servers ("servers") shown at reference numerals 102(1) and 102(2). The servers 102(1) and 102(2) reside in a rack unit ("rack"). The rack unit is not shown in FIG. 1, but it should be appreciated that the rack comprises the servers 102(1) and 102(2) as well as a physical switch device, which is shown in FIG. 1 at reference numeral 104. The physical switch device ("physical switch" or "switch device") is configured to manage communications within the rack. Thus, the physical switch 104 may also be referred to as a top of rack ("ToR") switch.

Though not shown in FIG. 1, the network 100 may have a plurality of racks, each of which has its own ToR switch, and the ToR for a rack manages communications to and from network devices and elements within that rack. Communications may be exchanged in the network 100 between devices and network elements within a single rack, and communications may also be exchanged in the network 100 between devices and network elements belonging to different racks. To manage such communications between racks, a controller device ("controller") is deployed in the network 100. The controller is shown at reference numeral 106. The controller 106 is in communication with the ToR switch 104 and with other ToR switches not shown in FIG. 1. The controller 106 may be, for example, a network device that is configured to manage communications between ToR switches of different racks. In one example, the controller 106 may be a physical network device (server) with controller software. In another example, the controller 106 may be a virtual machine hosted by a physical server, with controller software residing on the virtual machine. For simplicity, the controller 106 is described herein as a physical network device.

As stated above, the servers 102(1) and 102(2) may reside in a rack. The servers 102(1) and 102(2) are configured to exchange data communications (e.g., "packets") with each other and other servers and network devices in the network 100. Each of the servers 102(1) and 102(2) may be configured to host (e.g., in software) one or more virtual machines. The virtual machines are shown at reference numerals 108(*a*)-108(*e*). Virtual machine 108(*a*) may be referred to as "virtual machine A," virtual machine 108(*b*) may be referred to as "virtual machine B," and so on. It should be appreciated that any number of servers may be present in a rack, and each server may host any number of virtual machines. For example, in FIG. 1, server 102(1) hosts virtual machine A and virtual machine B, while server 102(2) hosts virtual machine C, virtual machine D and virtual machine E.

Each of the servers 102(1) and 102(2) may also be configured to host (e.g., in software) one or more virtual switches. The virtual switches are shown at reference numerals 110(1) and 110(2). FIG. 1 shows each of the servers 102(1) and 102(2) hosting one virtual switch.

The virtual machines 108(*a*)-108(*e*) are instantiated in memory of their respective host servers and are configured to operate functionally as typical physical servers. Thus, the virtual machines 108(*a*)-108(*e*) are configured to send and receive communications with each other and with other entities (e.g., physical servers and/or other virtual machines) in the network 100. Similarly, the virtual switches 110(1) and 110(2) are instantiated in memory of their respective host servers and are configured to operate functionally as typical physical switches. Thus, each of the virtual switches 110(1) and 110(2) is configured to route and forward communications originating from and destined for the virtual machines that the virtual switch is configured to manage. As shown in FIG. 1, the virtual switches 110(1) and 110(2) have virtual ports that are associated with particular virtual machines. For example, on server 102(1), port 1 of virtual switch 110(1) is associated with virtual machine A and port 2 of virtual switch 110(1) is associated with virtual machine B. Likewise, on server 102(2), port 1 of virtual switch 110(1) is associated with virtual machine C, port 2 of virtual switch 110(2) is associated with virtual machine D and port 3 of virtual switch 110(3) is associated with virtual machine E.

Each of the virtual switches is configured to maintain mapping information that comprises address information of the virtual machines that are in communication with (i.e., managed by) the virtual switch. For example, each of the virtual machines 108(*a*)-108(*e*) has a Media Access Control (MAC) address associated with it. In FIG. 1, the MAC address of virtual machine A is shown as "MAC_A," the MAC address of virtual machine B is shown as "MAC_B," and so on. Virtual switch 110(1), which handles network traffic for virtual machine A and virtual machine B, is configured to maintain a mapping table that stores the MAC addresses of virtual machine A and virtual machine B. The mapping table may store Open Systems Interconnection (OSI) layer 2 information and may also store (OSI) layer 3 information, such as Internet Protocol (IP) addresses, associated with the virtual machines. Virtual switch 110(2), which handles network traffic for virtual machine C, virtual machine D and virtual machine E, is configured to maintain a mapping table that stores the MAC addresses of virtual machine C, virtual machine D and virtual machine E. The mapping information maintained by each of the virtual machines 110(1) and 110(2) may also store other information associated with the respective virtual machines. For example, virtual machines 108(*a*)-108(*e*) may be assigned to particular Virtual Local Area Networks (VLANs) or Virtual Extensible Local Area Networks (VXLANs), and the mapping table maintained by each of the virtual switches 110(1) and 110(2) may contain information that identifies these particular VLANs and/or VXLANs for each virtual machine. Additionally, the mapping table maintained by each of the virtual switches 110(1) and 110(2) may also contain information that identifies ports of the virtual switch with which a virtual machine is associated.

As stated above, the virtual machines 108(1)-108(*e*) may communicate with each other and/or with other virtual machines in the network 100. For example, if virtual machine A is attempting to communicate with virtual machine B, virtual machine A will send a packet to the virtual switch 110(1) ultimately for transmission to virtual machine B. This packet will comprise, among other identifiers, a source MAC address identifying the MAC address of virtual machine A and a destination MAC address identifying the MAC address of virtual machine B. The virtual switch 110(1) receives this packet on port 1 of the virtual switch 110(1) and evaluates the packet to determine the source MAC address and the destination MAC address. Since the destination MAC address is stored in its mapping table, the virtual switch 110(1) will route the packet to virtual machine B.

In another example, if virtual machine A is attempting to communicate with virtual machine C, virtual machine A will send to the virtual switch 110(1) a packet that comprises a source MAC address for virtual machine A and a destination MAC address for virtual machine C. Since the MAC address of virtual machine C is not present in its mapping table, the virtual switch 110(1) will send an address request message on all of its ports (except the port on which the original packet was received) requesting the MAC address for virtual machine C. The address request message may be an Address Resolution Protocol (ARP) message or may be any other address request message that may be broadcast or sent in the network 100. Since the virtual switch 110(1) is hosted by the server 102(1), which is connected to the ToR switch 104, the ToR switch 104 will receive this request and will forward the address request message to the controller 106. In other words, the ToR switch 104 operates, for example, as an OpenFlow switch in accordance with an OpenFlow communications protocol defined by the Open Networking Foundation. The controller 106 stores (e.g., "builds") a full MAC table with MAC addresses of devices managed by the virtual switches 110(1) and 110(2). Upon receiving the address request message from the ToR switch 104, the controller 106 responds to the address request message using its MAC table information. Additionally, the controller 106 sends rules into a flow table on the ToR switch 104, and as a result, the ToR switch 104 forwards traffic according to the rules in its flow table. These techniques are described in detail below.

In traditional network environments, a ToR switch may receive an address request message, and in response to receiving the address request message, the ToR switch may perform a MAC address look up in a mapping table. In this example, a destination MAC address of a packet may not be available for the ToR switch. Thus, in traditional network environments, when the ToR switch receives a packet with an unknown destination MAC address, the ToR switch will typically broadcast or flood an address request message (e.g., an ARP message) on all of its ports, except on the port on which the packet was received. This broadcast or flood is known as an "ARP flooding." The ARP flooding is problematic because, as a network scales, and as more devices attempt to communicate with devices in different racks, ToR switches for each rack will flood a network every time that they receive a packet with an unknown destination (MAC) address. This type of ARP flooding may cause network congestion problems in data center environments and may degrade the speed and quality of network communications.

The techniques described herein overcome these problems. As mentioned above, the network 100 has a controller 106 that is in communication with the ToR switch 104 and other ToR switches (not shown in FIG. 1). The techniques described herein leverage the controller 106, and its connection to multiple ToR switches 104, to avoid the ARP flooding problem. In one example, in FIG. 1, the virtual switches 110(1) and 110(2) will register with the controller 106 upon being instantiated or shortly after being instantiated. The virtual switches 110(1) and 110(2), for example, will register (e.g., send a registration message) with the controller 106 using, e.g., an OpenFlow protocol. The OpenFlow protocol will ensure the registration of the ToR switch 104 (e.g., an OpenFlow or "OF" switch) to the controller. The ToR switch 104 may use another protocol or software (e.g., an Open Virtual Switch Database (OVSDB) Management Protocol or an Extensible Messaging and Presence Protocol (XMPP)) to enable the controller 106 to send OpenFlow rules to a flow table of the ToR switch 104. As shown at 112(1) and 112(2), upon registering with the controller 106, the virtual switches 110(1) and 110(2) will periodically send its mapping table, comprising the MAC address and other identifier information, to the controller 106. For example, each of the virtual switches 110(1) and 110(2) will send its mapping table periodically and after every update, after network conditions change (e.g., a new virtual machine joins the network 100), after a new MAC address is learned by the virtual switches 110(1) and 110(2), etc.

The controller 106 maintains a database, which is shown at reference numeral 114 in FIG. 1. Upon receiving the mapping information from the virtual switches 110(1) and 110(2), the controller can store the mapping information (including, e.g., the MAC addresses of the virtual machines 108(a)-108(e) and other identifier information) in its database 114. Likewise, the controller 106 may receive mapping information from other virtual switches in other racks, and thus, may update its mapping table to include the information contained in those mapping tables as well.

Just as the virtual switches 110(1) and 110(2) register with the controller 106, the ToR switch 104 is also configured to register with the controller 106 (e.g., by sending a registration message such as a message in accordance with an OpenFlow protocol). When the ToR switch 104 registers with the controller 106, it also registers one of its ports for communications between the ToR switch 104 and the controller 106. Upon such registration, the controller 106 sends a configuration message to the ToR switch 104 (e.g., at the registered port) to enable the ToR switch 104 to send ARP request messages (e.g., originating from a virtual switch, as shown at 116 in FIG. 1) only to the controller 106. These techniques are described below.

Figure 2:
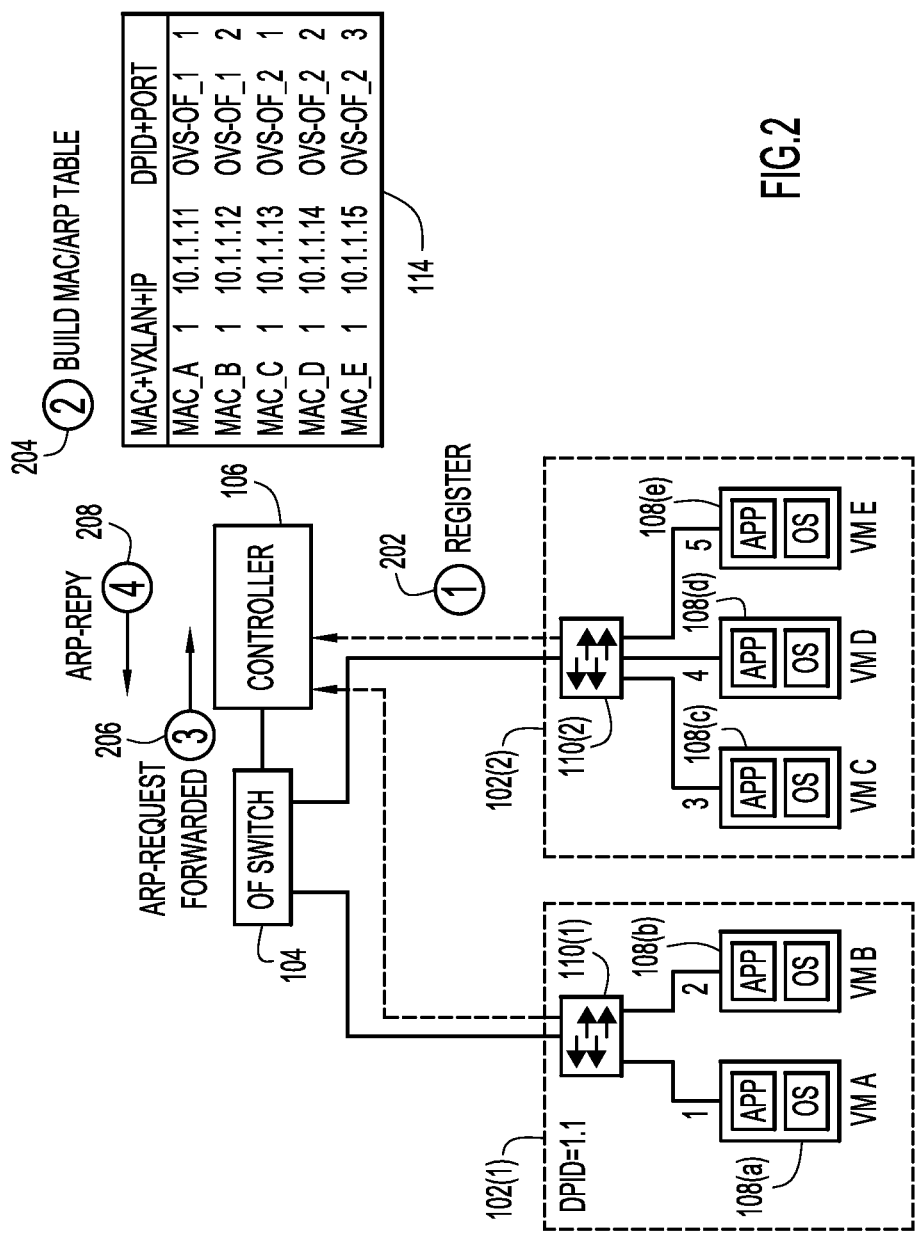
FIG. 2 shows an example network topology in which the controller device is configured to respond to an address request message received at the controller from a top of rack (ToR) switch.

Reference is now made to FIG. 2. FIG. 2 shows the network 100 in which the controller 106 is configured to respond to an ARP request message sent by the ToR switch 104. The network 100 in FIG. 2 comprises the same elements at those in FIG. 1. At reference numeral 202, the virtual switches 110(1) and 110(2) register with the controller 106 (e.g., by sending a registration request message). The virtual switches 110(1) and 110(2) also send to the controller 106 their respective mapping tables. The virtual switches 110(1) and 110(2) may send the mapping tables during the registration process itself or may send the mapping tables after registering with the controller 106. At reference numeral 204, the controller 106, upon receiving the mapping information from the virtual switches 110(1) and 110(2), populates its database 114 with the information from the mapping tables, including, e.g., MAC addresses and IP addresses of the virtual machines 108(1)-108(a) and corresponding VLAN/VXLAN and port information.

At reference numeral 206 in FIG. 2, the ToR switch 104 sends an ARP request message to the controller 106. It should be appreciated that, as stated above, the ToR switch 104 may have registered with the controller 106 prior to sending this ARP request message, and as a part of the registration process, the controller 106 may have sent to the ToR switch 104 a configuration message that comprises instructions for the ToR switch 104 to send to the controller 106 any ARP or other address request message received by the ToR switch 104. As stated above, absent such a configuration message, the ToR switch 104 would flood an ARP request message from all of its ports (e.g., except the port from which the packet with a missing destination address was received).

Upon receiving the ARP request message from the ToR switch 104, the controller 106 evaluates the ARP request message to determine an address (e.g., MAC address) associated with the missing destination address indicated in the ARP request message. The controller 106 looks up the MAC address in its database, and if the MAC address is present in its database, the controller sends the MAC address information to the ToR switch 104. As stated above, it should be appreciated that, though not shown in the database 114 in FIG. 2, the database 114 may comprise address information for devices and network elements in other racks in the network 100. After looking up the appropriate MAC address, the controller 106, at reference numeral 208 in FIG. 2, sends an ARP reply message to the ToR switch 104. In this example, the ARP reply message contains the missing MAC address, and thus, ARP flooding is avoided. Thus, in this example, the controller 106 is used as a proxy device in the network 100 to respond to the ARP request sent by the ToR switch 104. In the example where the missing MAC address is not in the database 114, the controller 106 will not respond to the ARP request message.

Figure 3:
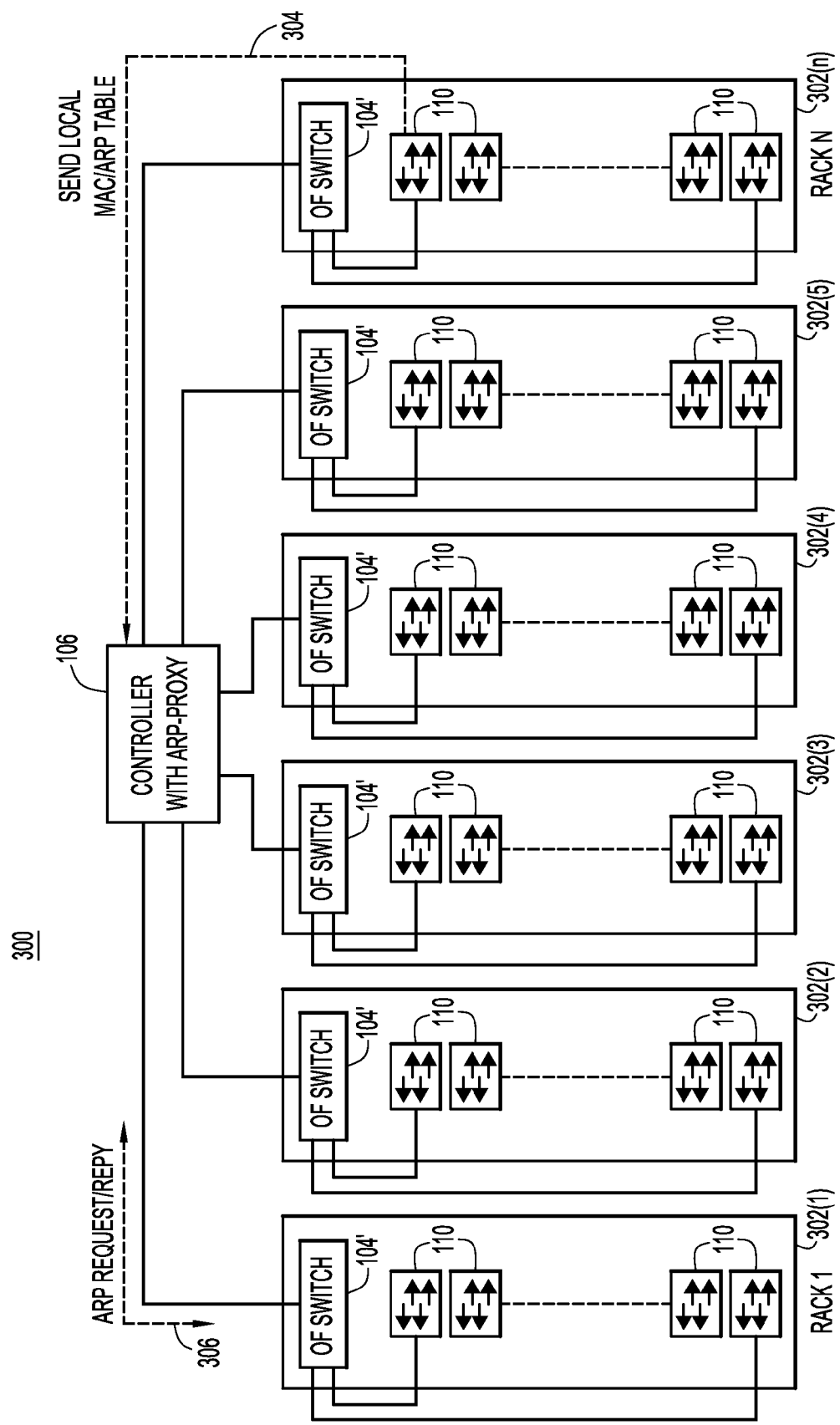
FIG. 3 shows an example network topology in which the controller device is configured to respond to address request messages from a plurality of ToR switches.

Reference is now made to FIG. 3. FIG. 3 shows an example network topology in which the controller 106 is configured to receive mapping information from multiple ToR switches and to respond to multiple ARP requests from ToR switches. As stated above, the controller 106 is configured to manage multiple ToR switches, each of which is associated with a different rack. The network 300 in FIG. 3 shows a plurality of racks at reference numerals 302(1)-302(n). Each of the racks 302(1)-302(n) has multiple servers, each of which may host one or more virtual switches. Thus, each of the racks 302(1)-302(n) shown in FIG. 3 has multiple virtual switches, shown generally in FIG. 3 at reference numeral 110. The virtual switches 110 each register with the controller 106, as described above, and also, as shown at reference 304, send their respective mapping tables to the controller 106. Upon receiving the mapping table from the virtual switches 110 in FIG. 3, the controller 106 updates its database 114 to include the address information and other identifier information of the virtual machines managed by each of the virtual switches. As a result, the database 114 of the controller 106 contains the address and other identifier information for all of the devices in racks 302(1)-302(n).

Also as stated above, each of the racks 302(1)-302(n) in FIG. 3 has a ToR switch. The ToR switches are shown generally at 104'. The ToR switches 104' also register with the controller 106, as described in connection with FIGS. 1 and 2 above. Upon registering with the controller 106, the ToR switches 104' are configured to send ARP request messages only to the controller 106 (thus preventing the ARP flooding scenario). The ToR switches 104' send the ARP request messages to the controller 106 and the controller 106 responds to the ARP request message by sending an ARP reply message that includes the address information sought by the ToR switches 104' in their respective ARP request messages. The ARP request and reply exchange is shown at reference numeral 306 in FIG. 3.

Reference is now made to FIG. 4, which shows an example ladder diagram 400 depicting messages that are exchanged between various components/entities in the network 100. In particular, FIG. 4 shows the exchanges that occur among a virtual machine, shown generally at reference numeral 108, a virtual switch, shown generally at 110, a physical switch (i.e., ToR switch), shown at 104 and the controller 106. It should be appreciated that the virtual machine 108 may represent any of the virtual machines 108(a)-108(e) in the network 100, and the virtual switch 110 may represent virtual switch 110(1) or 110(2) in the network 100. The physical switch 104 is the ToR switch 104 in the network 100.

At reference numeral 402, the virtual switch 110 sends a registration request message to the controller 106. The controller 106 responds by sending, at 404, a response message that registers the virtual switch 110 with the controller 106. At 406, the physical switch 104 sends a registration request to the controller 106, and at 408, the controller responds by sending a response message that registers the physical switch 104 with the controller 106. At 410, the virtual switch 110 performs MAC address learning techniques to determine the MAC address of the virtual machine 108. At 412, the virtual machine 108 sends the MAC address to the virtual switch 110, and at 414, the virtual switch 110 generates a mapping table that stores the MAC address of the virtual machine 108. The virtual switch 110 then sends, at 416, the mapping table to the controller 106. Upon receiving the mapping table, the controller 106 populates its database at 418. At 420, the virtual switch 110 sends an ARP request message to the physical switch 104. The ARP request message is forwarded from the physical switch 104 to the controller 106 at 422. Upon receiving the ARP request message, the controller 106, at 424, performs an address lookup to retrieve from its database the MAC address requested in the ARP request message. At 426, the controller 106 sends an ARP response message to the physical switch 104, and at 428, the ARP response message is forwarded to the virtual switch 110. Thus, the physical switch 104 and the virtual switch 110 receive the MAC address information requested in the ARP lookup without the physical switch 104 having to perform ARP flooding in the network 100.

Figure 5A:
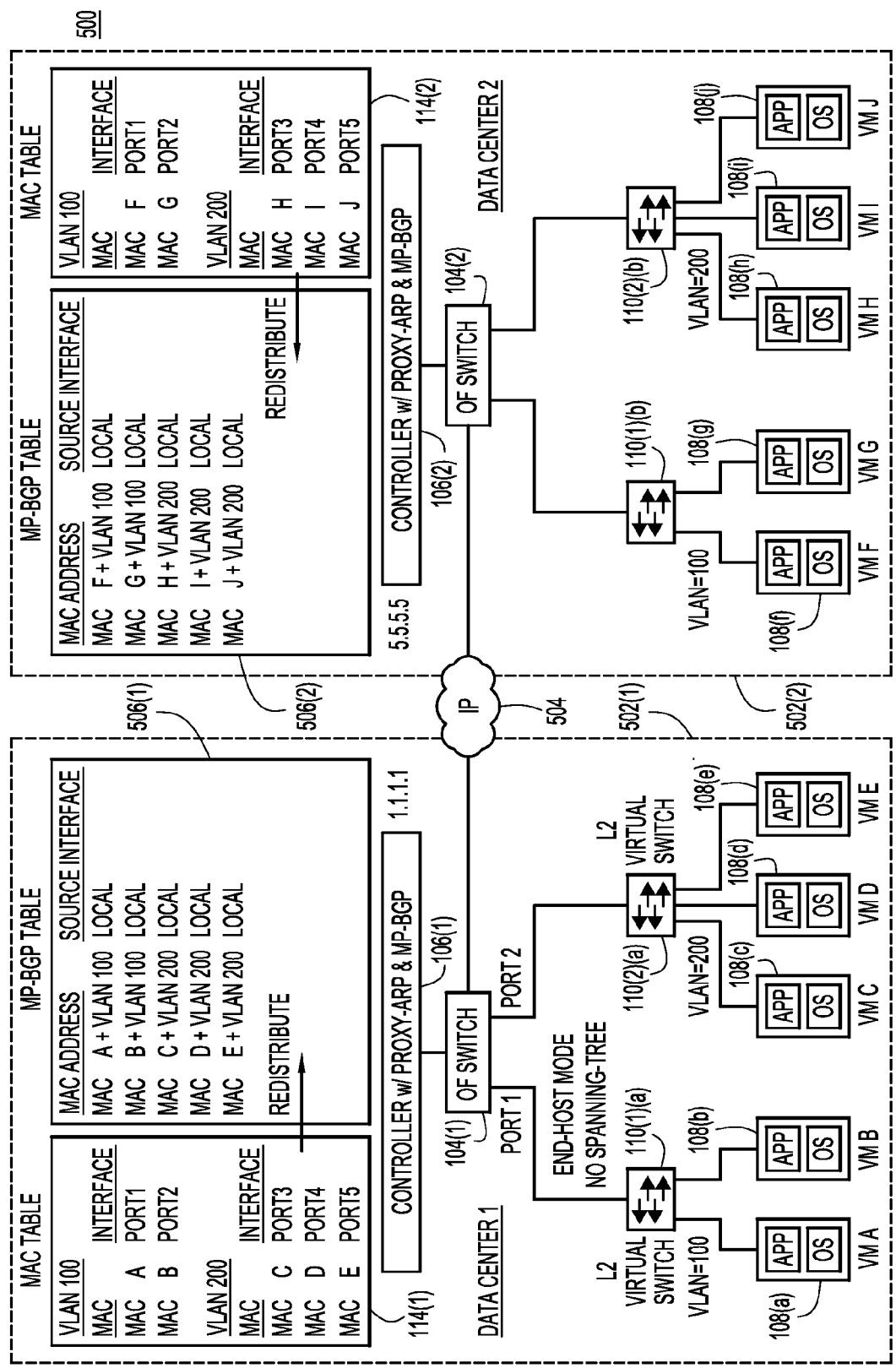
FIGS. 5A-5D show an example network topology comprising a plurality of controller devices configured to store local address information and to exchange the local address information with each other.

Reference is now made to FIGS. 5A-5D, which, in general show network topologies comprising a plurality of controllers, each configured to store local address information and to exchange the local address information with one another. Referring first to FIG. 5A, an example network topology 500 is shown. The network topology 500 comprises two data centers, shown at reference numerals 502(1) and 502(2) and labeled Data Center 1 and Data Center 2, respectively. Data centers 502(1) and 502(2) are configured to communicate with each other across an IP network (e.g., the Internet) shown at reference numeral 504. Each of the data centers 502(1) and 502(2) may have one or more racks.

In FIG. 5A, data center 502(1) and 502(2) are each shown with one rack. Data center 1 has a controller 106(1), a ToR switch 104(1), virtual switches 110(1)(a) and 110(2)(a) and virtual machines 108(a)-108(e). Likewise, data center 2 has a controller 106(2), a ToR switch 104(2), virtual switches 110(1)(b) and 110(2)(b) and virtual machines 108(f)-108(j). The components of data center 502(1) and 502(2) operate as described above. For example, the virtual machines, virtual switches, ToR switch and controller in each data center operate as previously described. Additionally, in one example, the virtual switches in FIG. 5A will primarily operate as OpenFlow switches, but they will also encapsulate layer 2 Ethernet frames into layer 3 (e.g., IP) packets. The frame format could be GRE, VXLAN or any IP encapsulation technology.

In FIG. 5A, controller 106(1) in data center 502(1) maintains a database 114(1) as well as a distributive table 506(1). Likewise, controller 106(2) in data center 502(2) maintains a database 114(2) and a distributive table 506(2). The databases 114(1) and 114(2) are of the same type as described in connection with database 114, above. In other words, in database 114(1), controller 106(1) maintains a list of MAC addresses obtained from mapping tables sent to it by virtual switches in data center 502(1). Likewise, in database 114(2), controller 106(2) maintains a list of MAC addresses obtained from mapping tables sent to it by virtual switches in data center 502(2). The distributive tables 506(1) and 506(2) contain the MAC address (and other identifier) information stored in databases 114(1) and 114(2) of the respective controllers 106(1) and 106(2). Additionally, the entries in the distributive tables 506(1) and 506(2) have an additional identifier that associates each MAC address entry with a source interface identifier. The source interface identifier indicates whether or not the MAC address is associated with a device or network element that is local to a controller or remote to a controller. As shown in FIG. 5A, the distributive table 506(1) indicates that the MAC addresses associated with virtual machines 108(a)-108(e) are local to controller 106(1), while the distributive table 506(2) indicates that the MAC addresses associated with virtual machines 108(f)-108(j) are local to controller 106(2). The distributive table 506(1) and 506(2) may be Multi-Protocol (MP) Border Gateway Protocol (BGP) tables, since these tables may be exchanged as MP-BGP messages between data centers across the IP network 504.

Figure 5B:
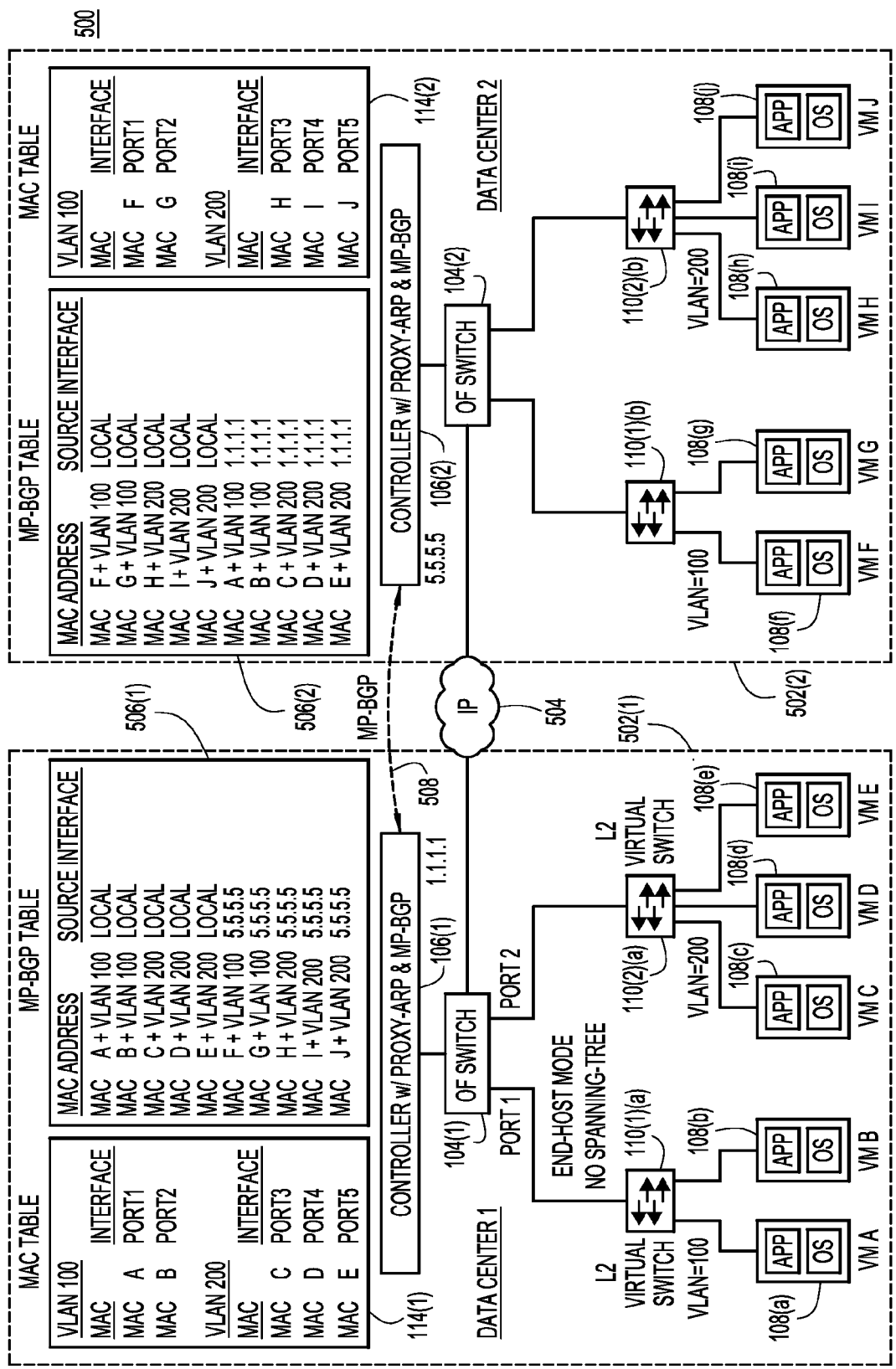

Reference is now made to FIG. 5B. FIG. 5B shows the data centers 502(1) and 502(2) described in connection with FIG. 5A. In FIG. 5B, each of the controllers 106(1) and 106(2) is configured to exchange MP-BGP messages with each other, as shown at reference numeral 508, across the IP network 504. As a part of the MP-BGP messages, the controllers 106(1) and 106(2) may exchange their respective distributive tables 506(1) and 506(2) with each other. Thus, when controller 106(1) sends its distributive table 506(1) to controller 106(2), controller 106(2) can update its own distributive table 506(2) to include the information contained in the distributive table 506(1) of controller 106(1). Specifically, upon receiving a remote distributive table from another controller (e.g., controller 106(1)), controller 106(2) can update its distributive table 506(2) to include the address information for the devices and entities in data center 502(1) and source interface identifier information (e.g., the IP address "1.1.1.1") of the controller 106(1). Likewise, upon receiving a remote distributive table from controller 106(2), controller 106(1) can update its distributive table 506(1) to include the address information for devices and entities in data center 502(2) and source interface identifier information (e.g., the IP address "5.5.5.5") of the controller 106(2).

Figure 5C:
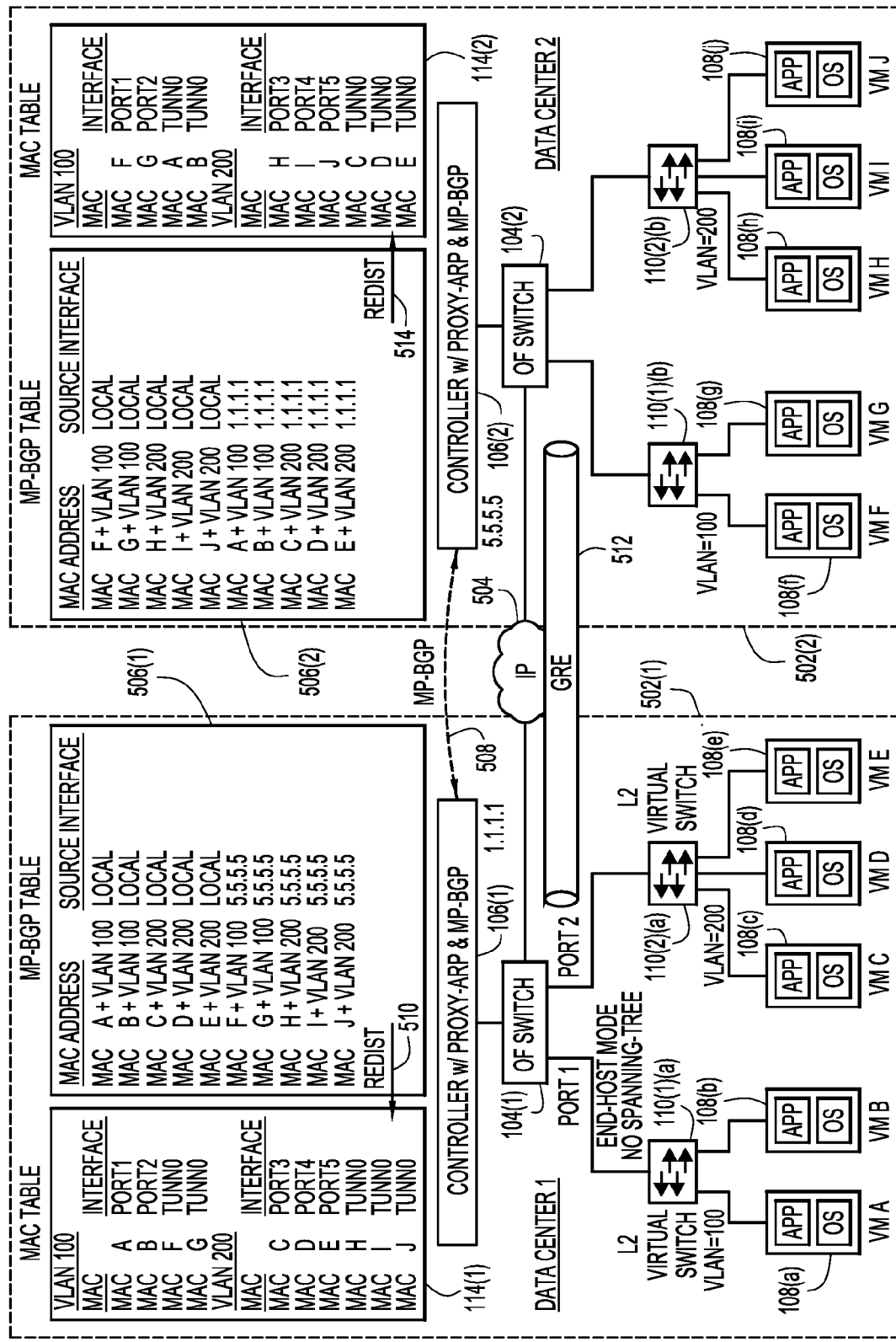

Reference is now made to FIG. 5C. FIG. 5C shows the data centers 502(1) and 502(2) described in connection with FIGS. 5A and 5B. In FIG. 5C, controller 106(1) and controller 106(2) have exchanged their respective distributive tables 506(1) and 506(2) with each other. The distributive tables are exchanged as MP-BGP messages, as shown at 508. In FIG. 5C, when controller 106(1) receives the distributive table 506(2) from controller 106(2), controller 106(1) updates its own distributive table 506(1) with the address information and source interface information that is present in the remote distributive table that it received. Upon updating its own distributive table, the controller 106(1) then redistributes (e.g., updates) its own database 114(1) to include the updated information. This redistribution/updating is shown at reference numeral 510. Thus, upon updating its database 114(1), the controller 106(1) has address information (e.g., MAC address information) of devices and entities in the remote data center 502(2). Additionally, the controller 106(1) stores a port identifier associated with each of these updated entries for devices and entities in the remote database 502(2). As shown in FIG. 5C, the port identifier for each of the entries in the remote database is associated with a "Tunn0" port. The "Tunn0" port is a port on ToR switch 104(1) that is associated with the Generic Routing Encapsulation (GRE) tunnel 512, shown in FIG. 5C. In other words, when an address entry is sent by the controller 106(1) to the ToR switch 104(1) (e.g., in response to an ARP request by the ToR switch 104(1)), the address entry is associated with a port that is mapped to the GRE tunnel. Packets that are destined for the address in the address entry are sent via the GRE tunnel across the IP network 104. It should be appreciated that when the virtual machines have VXLAN identifiers, the GRE tunnel 512 is not used. In this case, standard IP forwarding is performed by respective ToR switches.

Likewise, when controller 106(2) receives the distributive table 506(1) from controller 106(1), controller 106(2) updates its own distributive table 506(2) with the address information and source interface information in the distributive table 506(1) that it received. Upon updating its distributive table, the controller 106(2), at 514, redistributes (updates) its own database 114(2) to include the updated information. Thus, by updating database 114(2), controller 106(2) has address information (e.g., MAC address information) of devices and entities in the remote data center 502(1). The addresses of the devices and entities in the remote data center 502(1) are associated with the GRE tunnel 512, in a similar manner as that described for the addresses in the database 114(1).

Figure 5D:
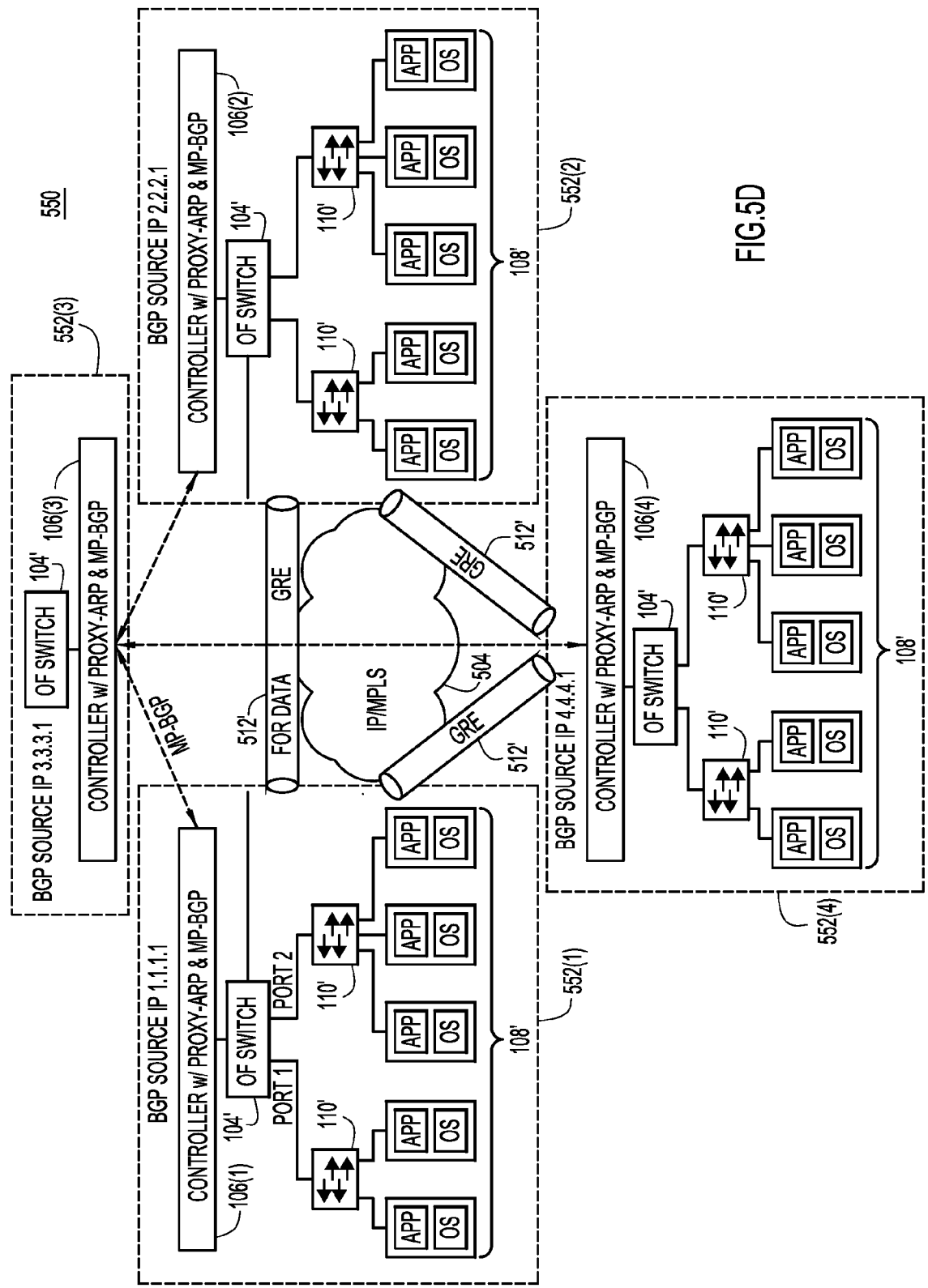

Reference is now made to FIG. 5D. FIG. 5D shows an example network topology 550 with multiple controllers configured to exchange distributive tables with each other. In FIG. 5D, the controllers are shown generally at 106(1)-106(n). The controllers 106(1)-106(n) each reside in a data center, shown at reference numerals 552(1)-552(n), and within each data center, respective controllers manage one or more ToR switches. For simplicity, each controller in FIG. 5D is shown to manage one ToR switch in one rack. The ToR switches are shown generally at 104', the virtual switches are shown generally at 110', and the virtual machines are shown generally at 108'. FIG. 5D also shows a plurality of GRE tunnels, shown generally at 512'.

In FIG. 5D, controller 106(3) is designated as a BGP route reflector. It should be appreciated that any of the controllers in FIG. 5D may be designated as a BGP route reflector, and that the depiction in network FIG. 5D is merely an example. When acting as the BGP route reflector, the controller 106(3) receives (e.g., across the IP network 504) the distributive tables from the other controllers 106(1), 106(2) and 106(4). Upon receipt of these distributive tables, controller 106(3) updates its own distributive table and also forwards (e.g., "reflects" in the network 550) the distributive tables to the other controller devices. Thus, for example, controller 106(1) receives from controller 106(3), the distributive tables for controller 106(2), 106(3) and 106(4).

Figure 6:
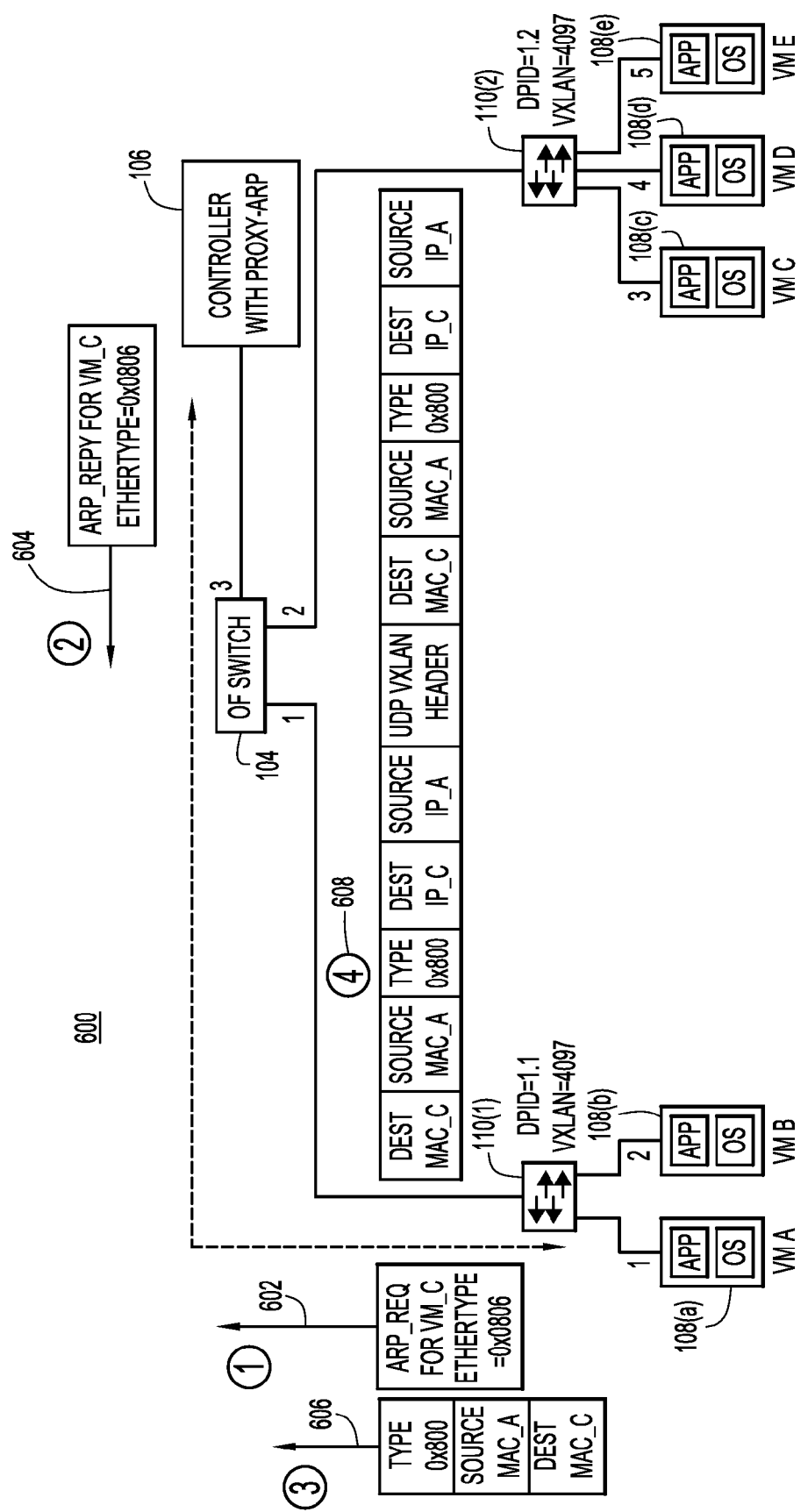
FIG. 6 shows an example network topology comprising virtual switches that are configured to modify an encapsulated packet to prepend Media Access Control information to the packet.

Reference is now made to FIG. 6. FIG. 6 shows the network 100 with virtual switches 110(1) and 110(2) configured to modify IP communications sent by virtual machines. In FIG. 6, it is assumed that virtual machine A is attempting to send a communication to virtual machine C. At reference numeral 602, the virtual switch 110(1), not having the destination MAC address of virtual machine C in its mapping table, sends an ARP request message to the ToR switch 104. The ToR switch 104 forwards the ARP request to the controller 106, as described by the techniques herein, and the controller 106, at 604, sends an ARP response message with the MAC address of virtual machine C. The ARP response is sent to the virtual switch 110(1) and is stored in the mapping table maintained by virtual switch 110(1). At reference numeral 606, virtual machine A sends a frame (e.g., Ethernet frame) to the virtual switch 110(1). At 608, the virtual switch 110(1) encapsulates the frame with a layer 3 encapsulation (e.g., IP encapsulation). For example, the virtual switch 110(1) may perform a VXLAN operation of the frame received from virtual machine A. After the layer 3 encapsulation, the virtual switch 110(1) also prepends to the frame a MAC address of virtual machine A (the source virtual machine) and a MAC address of virtual machine C (the destination virtual machine). Thus, the MAC addresses of virtual machine A and virtual machine C are accessible upon analysis of the packet without having to perform layer 3 decapsulation or other deep packet inspection of the frame.

Figure 7:
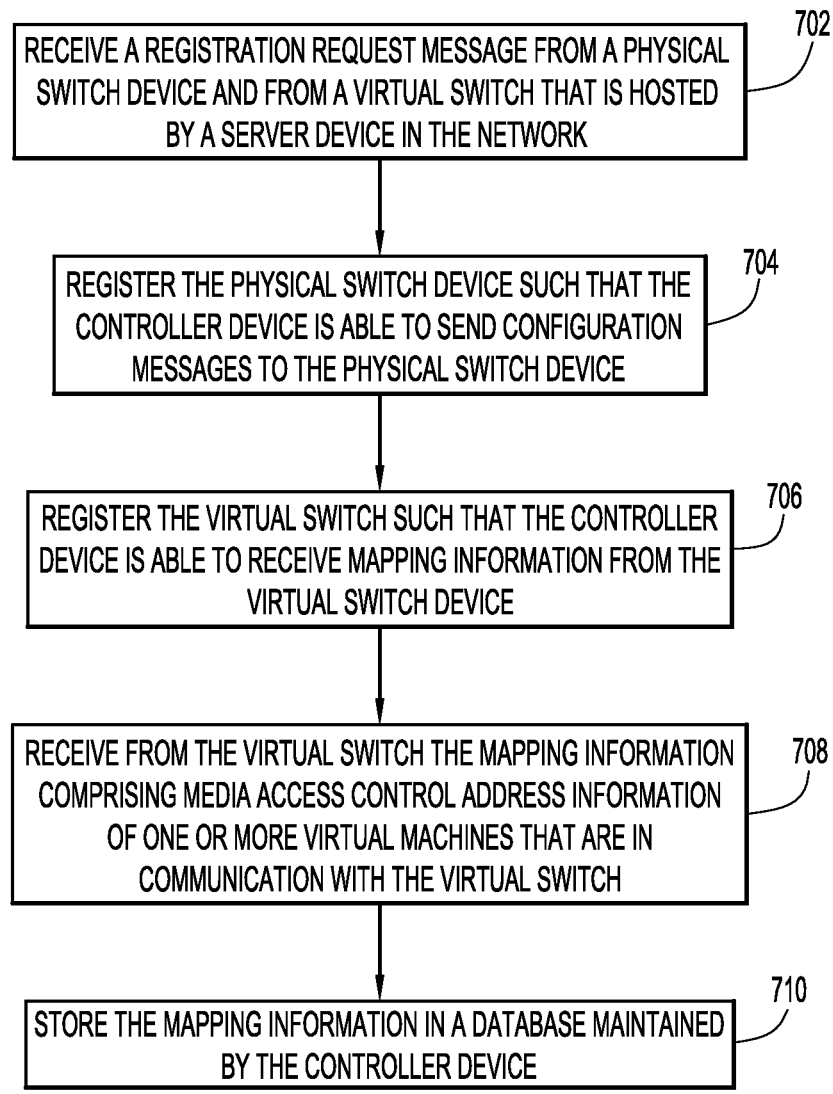
FIG. 7 shows an example flow chart depicting operations performed by the controller device to register the ToR switch and the virtual switch to store address information of virtual machines in the network.

Reference is now made to FIG. 7. FIG. 7 shows an example flow chart 700 depicting operations performed by the controller 106 to improve network congestion. At reference numeral 702, the controller 106 receives a registration request message from a physical switch device (e.g., the ToR switch 104) and from a virtual switch that is hosted by a server device in the network 100. The controller 106, at 704, registers the physical switch device in the network 100 such that the controller 106 is able to send configuration messages to the physical switch device. At 706, the controller registers the virtual switch such that the controller 106 is able to receive mapping information from the virtual switch. At 708, the controller 106 receives from the virtual switch the mapping information comprising MAC address information of one or more virtual machines that are in communication with the virtual switch. The controller 106, at 710, stores the mapping information in a database (e.g., database 114).

Figure 8:
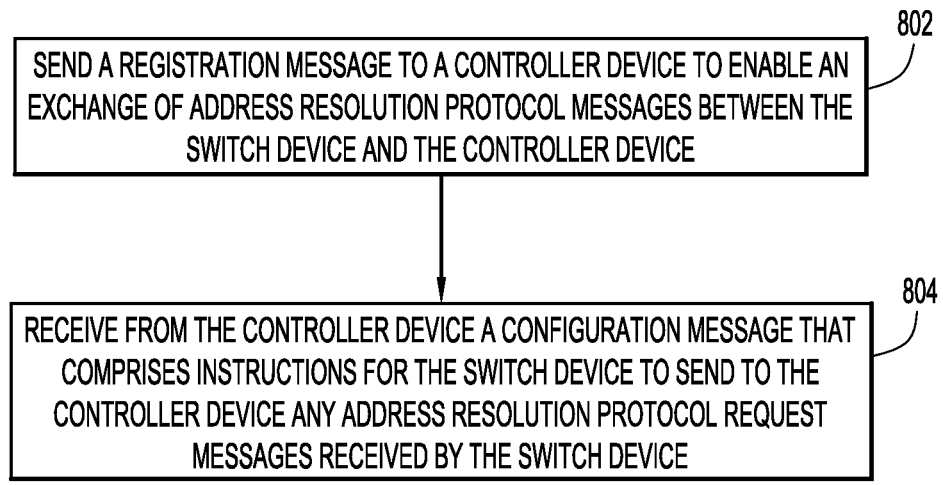
FIG. 8 shows an example flow chart depicting operations performed by the ToR switch to register with the controller device and to send address request messages to the controller device.

Reference is now made to FIG. 8. FIG. 8 shows an example flow chart 800 depicting operations performed by the ToR switch 104 to register with the controller 104 and to send ARP request messages to the controller 104. At 802, the ToR switch 104 sends a registration message to a controller device (e.g., controller 106) to enable an exchange of ARP messages between the ToR switch 104 and the controller 106. Though the flow chart 800 refers to ARP messages, any address request messages may be exchanged between the ToR switch 104 and the controller 106. At 804, the ToR switch 104 receives from the controller 106 a configuration message that comprises instructions for the ToR switch 104 to send to the controller 106 any ARP request messages received by the ToR switch 104.

Figure 9:
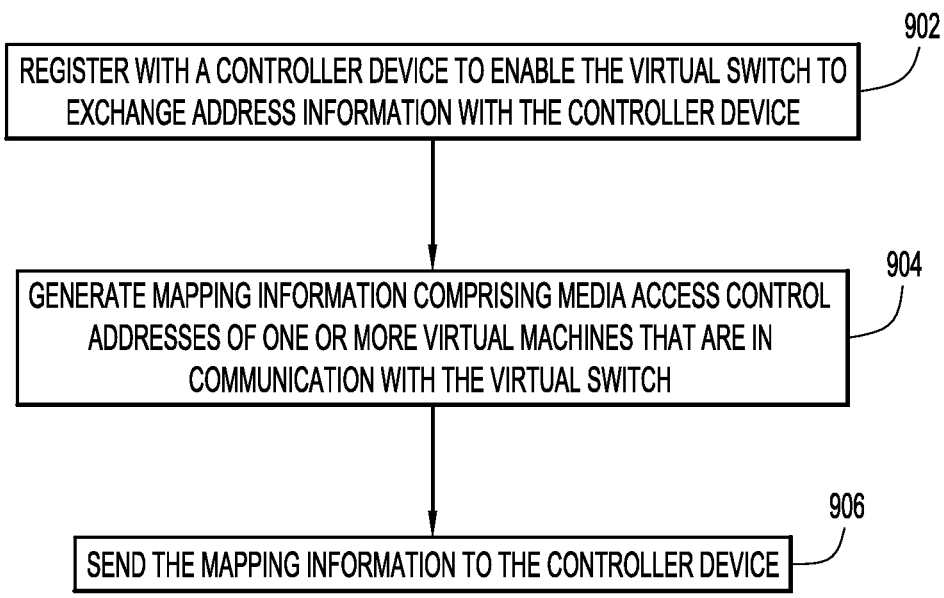
FIG. 9 shows an example flow chart depicting operations performed by the virtual switch to register with the controller device and to send mapping information of the addresses of virtual machines to the controller device.

Reference is now made to FIG. 9. FIG. 9 shows an example flow chart 900 depicting operations performed by a virtual switch to register with the controller 106 and to send mapping information to the controller 106. At 902, a virtual switch registers with the controller 106 to enable the virtual switch to exchange address information with the controller 106. The virtual switch, at 904, generates mapping information comprising MAC addresses of one or more virtual machines that are in communication with the virtual switch. At 906, the virtual switch sends the mapping information to the controller 106.

Figure 10:
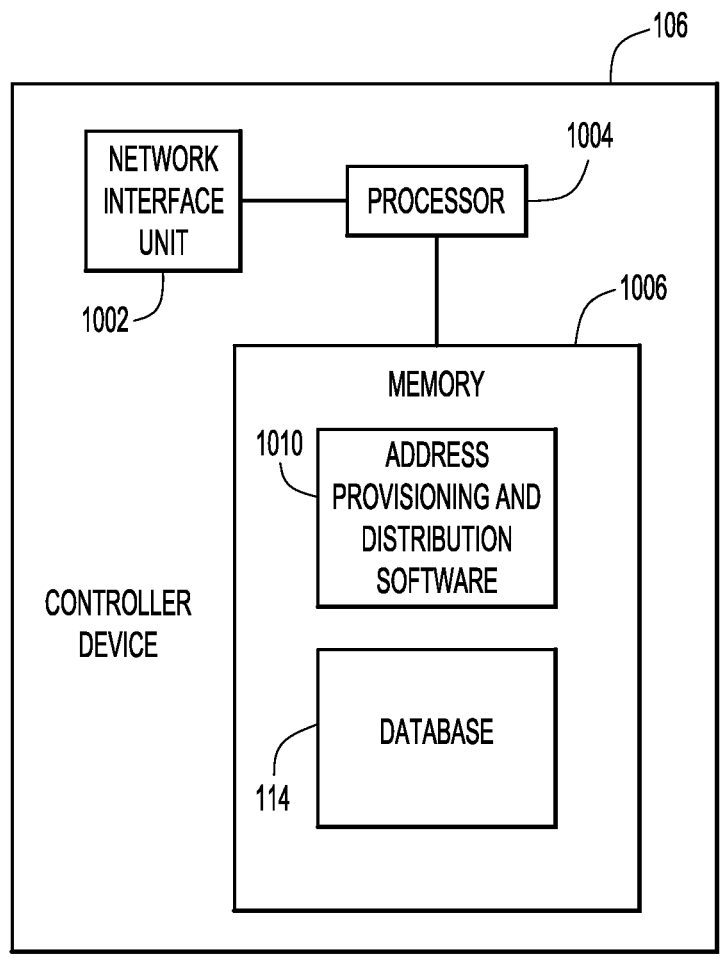
FIG. 10 shows an example block diagram of the controller device configured to store address information and to respond to address information request messages.

Reference is now made to FIG. 10, which shows an example block diagram of the controller 106. In one example, the controller 106 is a server or computer device. The controller 106 comprises a network interface unit 1002, a processor 1004 and memory 1006. The network interface unit 1002 is configured to receive communications (e.g., packets, provisioning information, etc.) from devices in the network 100 and is configured to send communications to devices the network 100. The network interface unit 1002 is coupled to the processor 1004. The processor 1004 is, for example, a microprocessor or microcontroller that is configured to execute program logic instructions (i.e., software) for carrying out various operations and tasks of the controller 106, as described above. For example, the processor 1004 is configured to execute address provisioning and distribution software 1010 to reduce network congestion in data center environments, as described herein. The functions of the processor 1004 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 1006 may comprise read only memory (ROM), random access memory (RAM), magnetic disk storage media devices, optical storage media devices, flash memory devices, electrical, optical, or other physical/tangible (non-transitory) memory storage devices. The memory 1006 stores software instructions for the address provisioning and distribution software 1010. The memory 1006 also stores a database 114, configured to store address information and other identifier information associated with devices and entities in the network 100 (e.g., virtual machines, virtual switches, physical servers and physical switches). Thus, in general, the memory 1006 may comprise one or more computer readable storage media (e.g., a memory storage device) encoded with software comprising computer executable instructions and when the software is executed (e.g., by the processor 1004) it is operable to perform the operations described for the address provisioning and distribution software 1010.

The address provisioning and distribution software 1010 may take any of a variety of forms, so as to be encoded in one or more tangible computer readable memory media or storage device for execution, such as fixed logic or programmable logic (e.g., software/computer instructions executed by a processor), and the processor 1004 may be an ASIC that comprises fixed digital logic, or a combination thereof.

For example, the processor 1004 may be embodied by digital logic gates in a fixed or programmable digital logic integrated circuit, which digital logic gates are configured to perform the address provisioning and distribution software 1010. In general, the address provisioning and distribution software 1010 may be embodied in one or more computer readable storage media encoded with software comprising computer executable instructions and when the software is executed operable to perform the operations described hereinafter.

Figure 11:
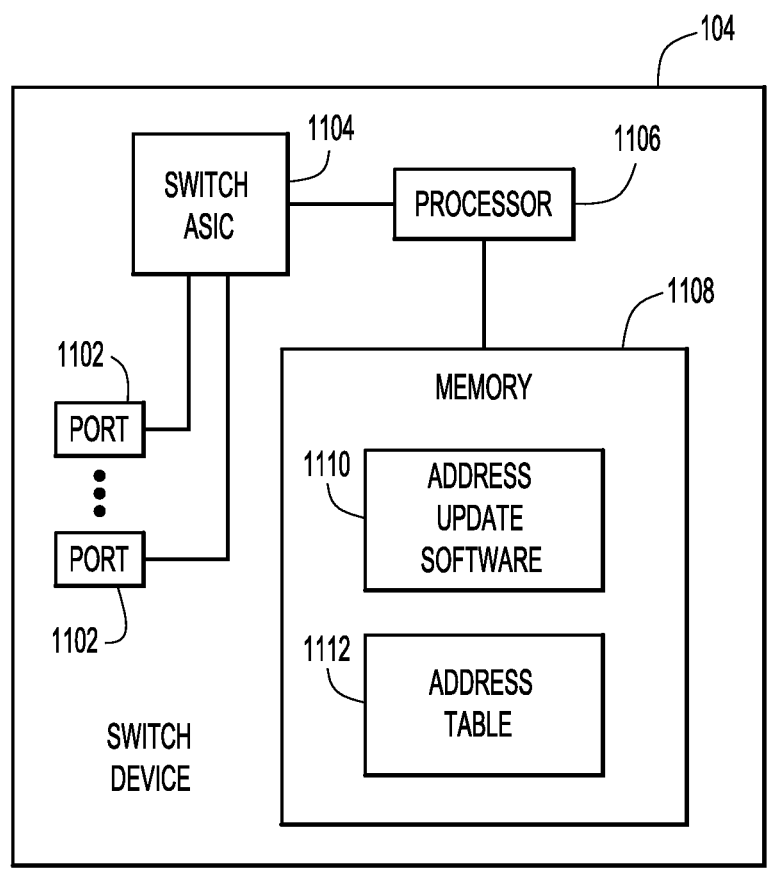
FIG. 11 shows an example block diagram of the ToR switch configured to register with the controller device and to send address request messages to the controller device.

Reference is now made to FIG. 11, which shows a physical switch device 104. The physical switch device 104 is the ToR switch 104 described herein. The ToR switch 104 comprises a plurality of ports 1102, a switch Application Specific Integrated Circuit (ASIC) 1104, a processor 1106 and a memory 1108. The ports 1102 are configured to receive communications (e.g., packets, provisioning information, etc.) from devices in the network 100 and are configured to send communications to devices in the network 100. The ports 1102 are coupled to the switch ASIC 1104. The switch ASIC 1104 is responsible for switching the communications to appropriate network devices. The switch ASIC 1104 is coupled to the processor 1106. The processor 1106 is similar to the processor 1004 described in connection with FIG. 10. The memory 1108 is also similar to the memory 1006 described in connection with FIG. 10. Additionally, the memory 1108 stores software instructions for the address update software 1110, which is configured to update address information in response to receiving messages (e.g., ARP response messages) from the controller 104, as described herein. The memory 1108 also stores an address table 1112, which stores address information for network devices and entities.

Figure 12:
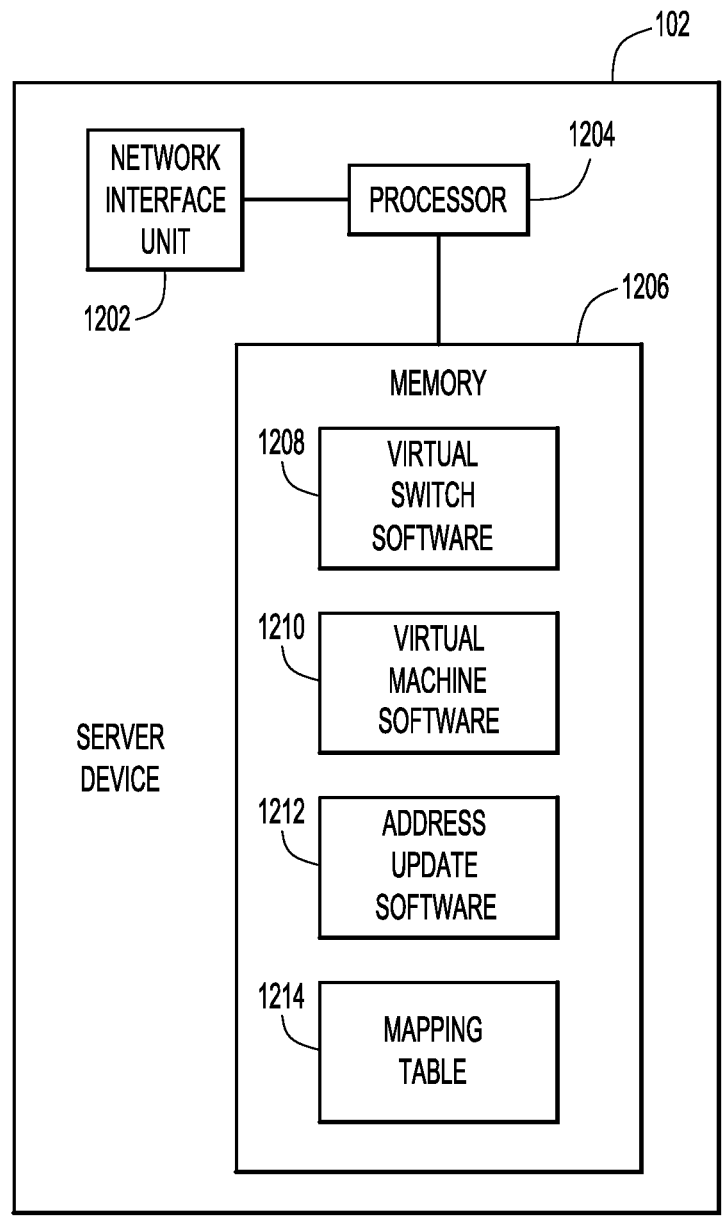
FIG. 12 shows an example block diagram of a physical server configured to host the virtual switch and to enable the virtual switch to register with the controller device.

Reference is now made to FIG. 12, which shows a block diagram 102 of a physical server. The physical server 102 in FIG. 12 may represent any of the servers described herein. The physical server 102 has a network interface unit 1202, a processor 1204 and a memory 1206. The network interface unit 1202 is similar to the network interface unit 1002, described in connection with FIG. 10, and is configured to send and receive communications in the network 100. The processor 1204 is similar to the processors 1004 and 1106 described in connection with FIGS. 10 and 11. The memory 1206 is also similar to the memory 1006 and the memory 1108 described in connection with FIGS. 10 and 11. The memory 1206 of the physical server 102 stores virtual switch software 1206 to host one or more virtual switches, virtual machine software 1210 to host one or more virtual machines, address update software 1212 and a mapping table 1214 to store address information maintained by one or more of the virtual switches.

It should be appreciated that the techniques described above in connection with all embodiments may be performed by one or more computer readable storage media that is encoded with software comprising computer executable instructions to perform the methods and steps described herein. For example, the operations performed by the virtual switches, ToR switches and controllers may be performed by one or more computer or machine readable storage media (non-transitory) or device executed by a processor and comprising software, hardware or a combination of software and hardware to perform the techniques described herein.

In summary, a method is provided comprising: at a controller device in a network, receiving a registration request message from a physical switch device and from a virtual switch that is hosted by a server device in the network; registering the physical switch device such that the controller device is able to send configuration messages to the physical switch device; registering the virtual switch such that the controller device is able to receive mapping information from the virtual switch; receiving from the virtual switch the mapping information comprising Media Access Control address information of one or more virtual machines that are in communication with the virtual switch; and storing the mapping information in a database maintained by the controller device.

In addition, one or more computer readable storage media is provided that is encoded with software comprising computer executable instructions and when the software is executed operable to: receive at a controller device a registration request message from a physical switch device and from a virtual switch that is hosted by a server device in the network; register the physical switch device such that the controller device is able to send configuration messages to the physical switch device; register the virtual switch such that the controller device is able to receive mapping information from the virtual switch; receive from the virtual switch the mapping information comprising Media Access Control address information of one or more virtual machines that are in communication with the virtual switch; and store the mapping information in a database maintained by the controller device.

Furthermore, an apparatus is provided comprising: a network interface unit configured to enable network communications; and a processor coupled to the network interface unit, and configured to: receive a registration request message from a physical switch device and from a virtual switch that is hosted by a server device in the network; register the physical switch device such that the apparatus is able to send configuration messages to the physical switch device; register the virtual switch such that the apparatus is able to receive mapping information from the virtual switch; receive from the virtual switch the mapping information comprising Media Access Control address information of one or more virtual machines that are in communication with the virtual switch; and store the mapping information in a database.

Additionally, a method is provided comprising: at a switch device in a network, sending a registration message to a controller device to enable an exchange of address request messages between the switch device and the controller device; receiving from the controller device a configuration message that comprises instructions for the switch device to send to the controller device any address request messages received by the switch device.

Furthermore, a method is provided comprising: at a virtual switch that is hosted by a server device in a network, registering with a controller device to enable the virtual switch to exchange address information with the controller device; generating mapping information comprising Media Access Control addresses of one or more virtual machines that are in communication with the virtual switch; and sending the mapping information to the controller device.

The above description is intended by way of example only. Various modifications and structural changes may be made therein without departing from the scope of the concepts described herein and within the scope and range of equivalents of the claims.

What is claimed is:

1. A method comprising:
   at a top of rack (ToR) switch device connected to one or more virtual switches hosted by a server device in a network, sending a registration message to a controller device to enable an exchange of address request messages between the ToR switch device and the controller device;
   receiving, from the controller device, a configuration message that comprises instructions for the ToR switch device to send any address request messages received from the one or more virtual switches to only the controller device; and
   based on the configuration message, configuring the ToR switch device to send address request messages received from the one or more virtual switches to only the controller device.

2. The method of claim 1, further comprising:
   receiving, at the ToR switch device, a first address request message from at least one of the one or more virtual switches, wherein the first address request message requests an address that is unknown to the at least one virtual switch;
   forwarding the first address request message to only the controller device; and
   receiving a response message from the controller device, wherein the response message includes the address that is unknown to the at least one virtual switch.

3. The method of claim 2, further comprising forwarding the response message to the at least one virtual switch that is hosted by the server device.

4. The method of claim 1, wherein the registration message is a non-bound Application Program Interface message.

5. The method of claim 1, wherein receiving the configuration message comprises receiving the configuration message at a port of the switch device, wherein the port is associated with communications exchanged between the ToR switch device and the controller device.

6. A method comprising:
   at a virtual switch that is hosted by a server device in a network, registering with a controller device to enable the virtual switch to exchange address information with the controller device, wherein the controller device is configured to control communications between the server device and one or more other server devices;
   generating, at the virtual switch, mapping information comprising Media Access Control addresses of one or more virtual machines that are hosted by the server device and which are managed by the virtual switch;
   sending the mapping information to the controller device receiving a message from at least one of the one or more virtual machines, wherein the message is directed to an address that is unknown to the switch device; and sending an address request message towards the controller device to obtain the address that is unknown to the virtual switch.

7. The method of claim 6, further comprising receiving an address response message that originates from the controller device.

8. The method of claim 7, further comprising:

receiving a packet from a source virtual machine in communication with the virtual switch;

encapsulating the packet with an Internet Protocol header;

modifying the packet by prepending to the packet a Media Access Control address of the source virtual machine and a Media Access Control address of a destination virtual machine in the network; and sending the modified packet to a physical switch device that manages communications from the virtual switch.

9. The method of claim 8, wherein modifying comprises modifying the packet such that the Media Access Control address of the source virtual machine and the Media Access Control address of the destination virtual machine are accessible to devices in the network that receive the modified packet.

10. The method of claim 6, wherein the virtual switch is configured to store a mapping table that comprises address information of the one or more virtual machines that are in communication with the virtual switch.

11. The method of claim 10, wherein the mapping table includes information that identifies one or more particular Virtual Local Area Networks (VLANs) or Virtual Extensible Local Area Networks (VXLANs) associated with each of the one or more virtual machines that are in communication with the virtual switch.

12. The method of claim 10, wherein the mapping table includes information that identifies ports of the virtual switch with which each of the one or more virtual machines are associated.

13. The method of claim 10, further comprising:

receiving, at the virtual switch, a packet from a first one of the one or more virtual machine, wherein the packet is directed to a second virtual machine that is not present in the mapping table; and sending the address request message on a plurality of ports of the virtual switch to request an address for the second virtual machine.

14. The method of claim 2, wherein the first address request message is an address resolution protocol (ARP) message.

15. An apparatus comprising:

a plurality of ports in communication with one or more virtual switches hosted by a server device in a network and with a controller device; and a processor configured to:

send a registration message to a controller device to enable an exchange of address request messages with the controller device;

receive, from the controller device, a configuration message that comprises instructions for the apparatus to send any address request messages received from the one or more virtual switches to only the controller device; and based on the configuration message, configure the apparatus to send address request messages received from the one or more virtual switches to only the controller device.

16. The apparatus of claim 15, wherein the processor is configured to:

receive a first address request message from at least one of the one or more virtual switches, wherein the first address request message requests an address that is unknown to the at least one virtual switch;

forward the first address request message to only the controller device; and receive a response message from the controller device, wherein the response message includes the address that is unknown to the at least one virtual switch.

17. The apparatus of claim 16, wherein the processor is configured to forward the response message to the at least one virtual switch that is hosted by the server device.

18. The method of claim 16, wherein the first address request messages is an address resolution protocol (ARP) message.

19. The method of claim 15, wherein the registration message is a non-bound Application Program Interface message.

20. The method of claim 15, wherein the processor is configured to receive the configuration message at a port that is associated with communications exchanged between the switch device and the controller device.

* * * * *